Feb. 12, 1935.  J. A. STOUGH  1,990,716
TANK GAUGING DEVICE
Filed April 13, 1931
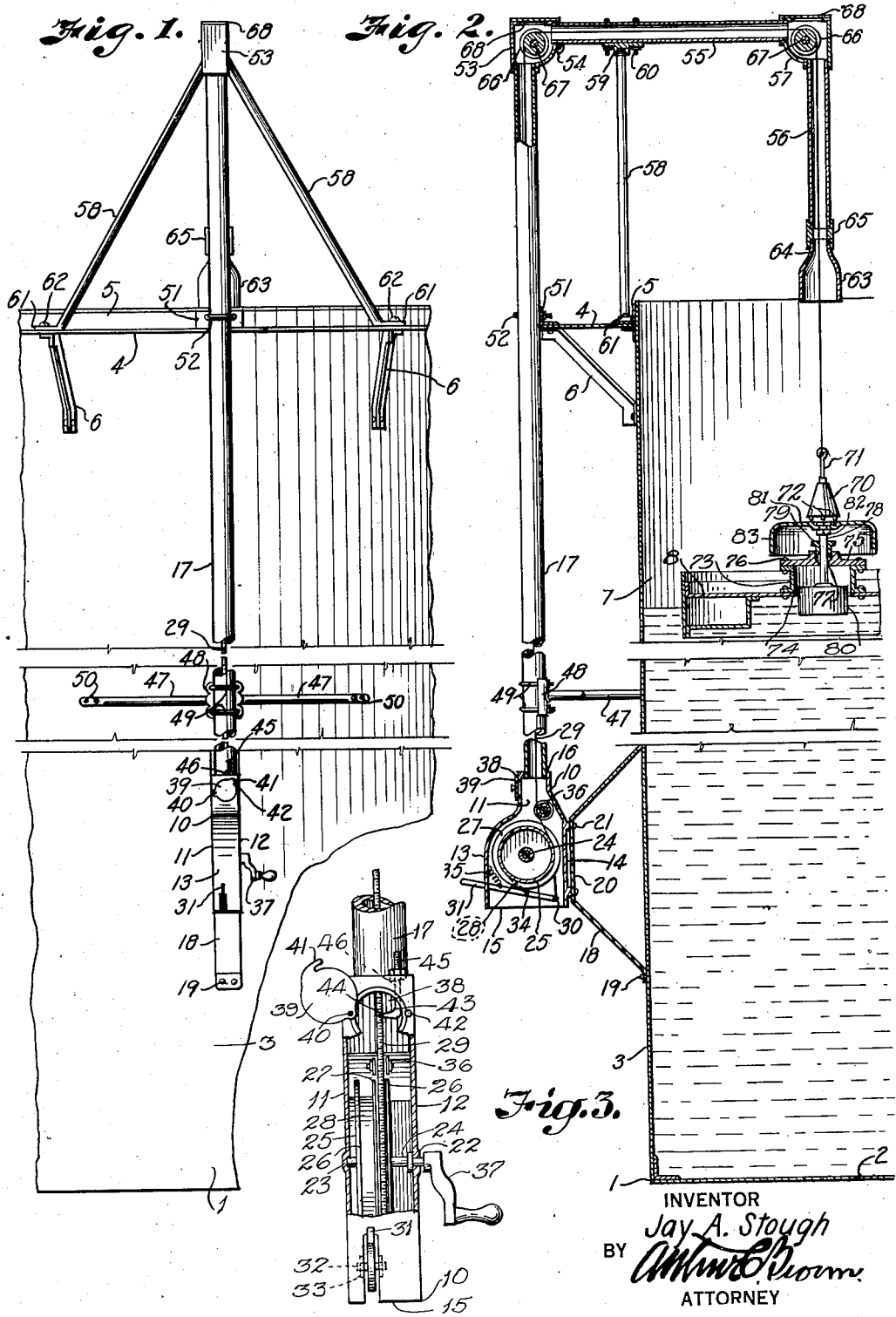
INVENTOR
Jay A. Stough
BY
ATTORNEY Patented Feb. 12, 1935

1,990,716

UNITED STATES PATENT OFFICE 1,990,716

TANK GAUGING DEVICE

Jay A. Stough, Tulsa, Okla.

Application April 13, 1931, Serial No. 529,569

5 Claims. (Cl. 73—82)

My invention relates to gauges and more particularly to apparatus of that character for gauging the depth of liquids in tanks to determine the quantity of liquid contained in a tank.

Various forms of gauges have been provided for this purpose, particularly for tanks having permanent roofs, but in most of these devices a portion of the gauge line remains continually in the liquid or gases within the tank and is subjected to deterioration by these elements, or a portion of the line is exposed to the weather elements and, as a result, soon rusts or corrodes.

It is the principal object of my invention, therefore, to provide a device wherein the line is normally withdrawn from the liquid in the tank and is also entirely housed and protected from the liquid, gases, and weather elements.

Another object of the invention is to provide a device that may, with slight modifications, be used for ascertaining the quantity of liquid in a tank having a floating deck of either plain or pontoon type, or having a permanent deck.

In accomplishing these and other objects of my invention I have provided improved details of structure, the preferred forms of which are illustrated in the accompanying drawing, wherein:

Fig. 1 is a front elevational view of the gauge mounted in functional position on a storage tank.

Fig. 2 is a side elevational view of the apparatus shown in connection with a floating pontoon type of deck and of a float mechanism for supporting a gauge bob, the tank, deck, and portions of the gauging apparatus being shown in section to more clearly illustrate the operation of the gauge.

Fig. 3 is a front elevational view of the brake, reel, and gauge line with a portion of the reel housing broken away to more clearly show these parts.

Referring more in detail to the drawing:

1 designates a tank, such as is commonly employed for storing crude oil or by-products of petroleum, and includes a bottom wall 2, a peripheral side wall or tank shell 3 and a girder 4 secured to the shell adjacent its upper edge by an annular angle member 5 and braces 6. Tanks of this type are provided with floating decks 8 as shown in Fig. 2.

The gauging apparatus includes a reel housing 10 having side walls 11 and 12, a front wall 13 and a rear wall 14, its lower end being open as shown at 15, and its upper end terminating in a restricted threaded opening 16 for receiving the lower threaded end of a vertical conduit section 17. The housing is spaced from and secured to the tank wall by an angular bracket 18 having end flanges 19 engaging the tank wall and fixed thereto in any suitable manner, and an intermediate portion 20, parallel to the tank wall, may be secured to the housing by screws, as indicated at 21.

Rotatably mounted in a bearing opening 22 in the housing wall 12 and in an aligning bearing socket 23 in the wall 11 is a shaft 24 carrying a drum 25 having side flanges 26 and an intermediate flange 27 to provide spaced annular grooves for a brake band 28 and for a gauge line 29 respectively. One end of the brake band is attached to the pivoting end 30 of a brake lever 31 mounted on a pin 32 extended through ears 33 of the drum housing and the opposite end of the band is attached to the lever intermediate its ends by a pin, as shown at 34 in Fig. 2. The brake lever is normally retracted to inoperative position by a spring 35 secured to the front wall of the housing and to the lever.

Concentric alignment of the tape with the housing 17 is maintained by an idler pulley 36 rotatably mounted in the housing above the spooling drum and rotation of the drum is effected by a crank 37 fixed on the shaft 24.

The front wall of the housing is further provided with a window 38 adapted to be closed by a cover 39 pivotally mounted on a pin 40 so that it may be rotatably moved in and out of closed relation with the window, and a projecting ear 41 on the cover engages a pin 42 on the housing when in closed position to insure proper alignment of the cover with the window opening and to maintain the cover in closed condition.

An indicator 43 having a lateral pointer 44 aligning with the gauge line is adjustably mounted in the upper end of the housing by a threaded upper end 45 and adjusting nuts 46 threaded thereon engage opposite faces of the upper end wall of the housing.

Means for rigidly supporting the vertical section 17 in its relation with the tank includes diverging brace rods 47 anchored in an arcuate plate 48 fixed to the supporting section by U-bolts 49 and the opposite ends of the rods may be secured to the tank wall by bolts 50. The supporting section 17 is further secured to the girder 4 by an angle plate 51 and a U-bolt 52.

Fixed on the upper end of the tubular section 17 is an elbow housing 53 having a laterally threaded opening 54 for receiving a horizontal section 55 projecting over the top of the tank and connected with a downwardly depending section 56 in parallel relation with the section 17 by an elbow housing 57 threadedly engaging the inner end of the horizontal section and the upper threaded end of the depending portion.

A vertical support for the tubular guides comprises downwardly diverging brace rods 58 having upper ends secured in an arcuate seat 59 clamped to the horizontal member 55 by U-bolts 60, and the lower ends of the rods terminate in foot portions 61 fixed by bolts 62, or the like, to the peripheral angle 5 of the tank girder.

A hood 63 having a swaged neck 64 is secured to the lower end of the depending section 56 by a coupling 65 for a purpose presently described.

Each of the elbow housings rotatably supports a grooved guide roller 66 mounted on a transverse shaft 67 journalled in the housing, and closure plates 68 are removably attached to the open upper end of the housings to permit mounting of the guide rollers in the elbows.

The gauge or tape line 29 having one end anchored to the drum 25 is guided concentrically through the vertical section 17, the horizontal section 55 and the depending portion 56 by the guide pulleys 36 and 66 and its opposite end extends downwardly from the hood 63 and is secured to a conical shaped gauge bob 70 by an eyebolt 71.

Spaced projections or foot portions 72 on the lower end of the gauge bob serve to insure proper seating of the bob on float mechanism if a layer of sediment has accumulated thereon.

In the pontoon type of tank decks, the depth to which the deck will be submerged in the liquid in the tank will vary due to liquid collecting on the surface of the deck, to gas pressure accumulating below the deck and adding to the buoyant effect of the pontoons, or to other causes, and the readings taken after lowering a gauge bob on the tank deck would not be accurate for these reasons.

I have, therefore, provided a float attachment to be used with my apparatus for taking readings on tanks wherein floating decks of the pontoon type are used. This float structure is particularly illustrated in Fig. 2 and includes a flanged section 73 surrounding an opening 74 formed in the deck 8. A cover plate 75 is fixed to the upper flange of the section 73 by means, such as bolts 76, and is provided with a concentric opening 77 for guiding a stem 78 secured in its sliding relation with the cover by a packing gland 79. The lower end of the shaft carries a float 80 adapted to rest on the surface of the liquid in the tank and the upper end of the stem supports a cover plate 81 fixed thereto by nuts 82 and having a downwardly extending peripheral flange 83 to prevent collection of dirt on the cover plate 75. As will be obvious from the drawing, the elevation of the gauge bob, when positioned on the hood 81, will be determined by the float and not by the pontoon deck, a soft packing being provided for the gland to prevent escape of gas from the chamber above the body of oil and beneath the deck, and to prevent excessive resistance to the float stem in its sliding travel through the gland. The retention of gases in the section 73 by the packing further insures uniform pressure on the entire float surface.

Assuming an apparatus to be constructed and assembled on a tank having a floating roof of the pontoon type, the operation for determining the depth of liquid in the tank would be as follows:

By rotating the crank in anti-clockwise direction the gauge line is unwound from the spool until the plumb bob contacts the hood 81. The length of the tape unwound from the spool may then be observed by opening the closure plate and noting the calibrations on the tape aligning with the indicator 43. After a reading has been taken the crank is rotated in a clockwise direction to wind the tape on the spool until the gauge bob is drawn into the hood 63. When in this position it is apparent that the tape is entirely inclosed within the housing and tubular guide sections and is fully protected. This not only prevents corrosion of the line by action of chemicals in the liquid or gases but also prevents accumulation of ice on the line which would tend to stretch the line and result in inaccuracy of calculation when measuring the contents of a tank.

What I claim and desire to secure by Letters Patent is:

1. In combination with a pontoon-type floating deck having an opening, tank gauging apparatus including a float movably guided in said opening and adapted to rest on a body of liquid below the deck, a gauge line movably suspended above the float, a gauge bob on the line engageable with the float, and means in conjunction with the gauge line for indicating level of liquid below the deck.

2. In combination with a floating deck having an opening, a member on the deck for guiding a float relative to said opening, a float in guide relation with said member and adapted for buoyant support on a body of liquid below the deck, a gauge line movably suspended above the float, a gauge bob on the line engageable with the float, and means in conjunction with the gauge line and bob for indicating level of liquid below the deck.

3. In combination with the floating deck of a liquid storage tank, having a vertical opening, a tubular member for guiding a float relative to said opening, a float buoyantly supported by liquid in the tank and movable in guided relation to the tubular member independently of movement of the deck, a gauge line movably suspended above the float, a gauge bob on said line engageable with the float, and means in conjunction with the gauge line for indicating depth of liquid in the tank.

4. In combination with a pontoon-type floating deck having an opening, a tubular member surrounding the opening, a cover for said member having a guide opening, tank gauging apparatus including a float extended through the deck opening and having a stem slidable in the guide opening, stop means on said stem, a gauge line in substantially concentric alignment with the float, a gauge bob on the line engageable with said stop means, and means in conjunction with the gauge line for indicating level of liquid below the deck.

5. In combination with a pontoon-type floating deck having an opening, a tubular section surrounding the opening, and a cover for said section having a guide opening, tank gauging apparatus including a float adapted to rest on a body of liquid below the deck, a stem on the float extended through said guide opening, a hood carried by the stem in covering relation with said tubular section, a gauge line in substantially concentric alignment with the float, a gauge bob on the line engageable with said hood, and means in conjunction with the gauge line for indicating level of liquid below the deck.

JAY A. STOUGH.